United States Patent
Beselt

(10) Patent No.: US 8,196,516 B2
(45) Date of Patent: Jun. 12, 2012

(54) ROCKER WHEEL SYSTEM FOR SCANNER CARRIAGES

(75) Inventor: Ron Beselt, Burnaby (CA)

(73) Assignee: Honeywell ASCa Inc., Mississauga (CA)

(*) Notice: Subject to any disclaimer, the term of this patent is extended or adjusted under 35 U.S.C. 154(b) by 107 days.

(21) Appl. No.: 12/882,466

(22) Filed: Sep. 15, 2010

(65) Prior Publication Data

US 2012/0060718 A1 Mar. 15, 2012

(51) Int. Cl.
*B61B 3/00* (2006.01)
(52) U.S. Cl. ............................................ 104/95; 104/89
(58) Field of Classification Search ............... 104/89–95
See application file for complete search history.

(56) References Cited

U.S. PATENT DOCUMENTS

| | | | | |
|---|---|---|---|---|
| 2,393,324 A * | 1/1946 | Joy | 376/160 |
| 3,446,158 A * | 5/1969 | Pettit | 104/95 |
| 3,518,947 A * | 7/1970 | Borst | 105/30 |
| 3,543,687 A * | 12/1970 | Ellzey | 104/95 |
| 3,568,605 A * | 3/1971 | Pettit | 104/95 |
| 4,473,011 A * | 9/1984 | Wuschek | 104/173.1 |
| 4,641,587 A * | 2/1987 | Dalliard | 105/3 |
| 4,742,777 A * | 5/1988 | Tarassoff | 104/173.2 |
| 4,879,471 A | 11/1989 | Dahlquist | |
| 4,957,047 A * | 9/1990 | Feuz et al. | 104/204 |
| 5,094,535 A | 3/1992 | Dahlquist | |
| 5,465,668 A * | 11/1995 | Tarassoff et al. | 104/95 |
| 5,660,401 A * | 8/1997 | Yi | 280/11.225 |
| 5,941,542 A | 8/1999 | Kalman | |
| 6,021,718 A | 2/2000 | Kroll | |
| 6,123,028 A * | 9/2000 | Bellezza | 104/172.3 |
| 6,142,929 A | 11/2000 | Padgett | |
| 6,281,679 B1 | 8/2001 | King | |
| 6,428,026 B1 | 8/2002 | Smith | |
| 6,991,249 B2 | 1/2006 | Shapiro | |
| 7,004,077 B2 * | 2/2006 | Meindl | 104/173.1 |
| 7,533,741 B2 * | 5/2009 | Brazier | 180/9.5 |
| 7,552,685 B2 * | 6/2009 | Frangos et al. | 104/112 |
| 7,552,929 B2 | 6/2009 | Grethel | |
| 7,599,582 B2 * | 10/2009 | Beselt et al. | 385/13 |
| 7,798,068 B2 * | 9/2010 | Nishihara et al. | 104/172.4 |
| 2006/0273540 A1 * | 12/2006 | Heron et al. | 280/124.116 |

FOREIGN PATENT DOCUMENTS

| | | |
|---|---|---|
| EP | 0378781 A1 | 7/1990 |
| GB | 559171 A | 2/1944 |

OTHER PUBLICATIONS

European Search Report EP 11180992 Dec. 14, 2011.

* cited by examiner

*Primary Examiner* — S. Joseph Morano
*Assistant Examiner* — Jason C Smith
(74) *Attorney, Agent, or Firm* — Cascio Schmoyer & Zervas

(57) ABSTRACT

A sensor head-transporting roller carriage has four pairs of wheels acting around pivot points at the four corners of the carriage, which is advanced along tracks that are supported by vertical structures. The lateral wheel spacing is chosen in correlation with the track support interval distances such that the vertical travel of all the wheels together is averaged, to be zero. As a result, variations in displacement alignment of the sensor are minimized. In addition, the pivot mechanism results in a fifty percent reduction in the effect of random vertical deflections caused by track debris or wheel concentricity etc. versus standard non-pivoting wheel sets. The roller carriage moves the sensor head along the cross direction to monitoring physical characteristics of a web of material that is moving in the machine direction.

13 Claims, 4 Drawing Sheets

ROCKER WHEEL SYSTEM FOR SCANNER CARRIAGES

FIELD OF THE INVENTION

The present invention generally relates to a scanning sensor that employs a roller carriage that transports the sensor on tracks that are supported by vertical structures that are mounted at intervals along the length of the tracks. The wheel spacing for the rocker wheel system in the carriage is chosen in correlation with the track support structure interval distances such that variations in displacement alignment of the sensor are minimized.

BACKBROUND OF THE INVENTION

It is often desirable to obtain measurements of selected characteristics of sheet materials during manufacture. Although various properties of sheet materials can be detected by off-line laboratory testing, this procedure is often not practical because of the time required for sample acquisition and analysis. Also, laboratory testing has the shortcoming that samples obtained for testing may not accurately represent sheet material that has been produced.

To overcome the drawbacks of laboratory testing of sheet materials, various sensor systems have been developed for detecting sheet properties "on-line," i.e., on a sheet-making machine while it is operating. Typically, on-line sensor devices are operated to periodically traverse, or "scan," traveling webs of sheet material during manufacture. Scanning usually is done in the cross direction, i.e., in the direction perpendicular to the direction of sheet travel. Depending upon the sheet-making operation, cross-directional distances can range up to about twelve meters or more.

Sensors for continuous flat sheet production processes typically employ single or double sided packages which traverse the width of the sheet, guided on rail systems affixed to stiff beam structures. Often the accuracy of the sensor system is related to the relative x, y, z displacement alignment between upper and lower sensor halves, therefore it is of particular interest to designers of such mechanisms to be able to reduce alignment errors.

SUMMARY OF THE INVENTION

The present invention is based in part on the recognition that the gap between sensors in scanning systems can be easily influenced by conditions such as initial track alignment, track material straightness, track deflection caused by sensor payload in unsupported areas between mounting points, wheel concentricity, material buildup on wheels, material buildup on track surfaces, and track wear. Vertical deflection of track material between adjustment supports can cause sinusoidal alignment errors in sensor profiles. By using a pair of wheels acting around a pivot point at the four corners of the roller carriage, wheel spacing can be chosen in correlation with track support interval distances such that the vertical travel of all the wheels together is averaged to be zero. Other benefits of the present invention include a fifty percent reduction in the effect of random vertical deflections caused by track debris or wheel concentricity etc. versus standard non-pivoting wheel sets, and automatic load sharing of wheels thereby enabling the use of stiff/hard mating materials.

In one aspect, the invention is directed to a transport carriage that includes:
a frame having a longitudinal axis, an upper surface, a lower surface, a front end and a rear end;
a first pair of wheels positioned in tandem, wherein the first pair of wheels are secured to a first rigid member that is pivotally mounted to the frame such that the first pair of wheels are located on a first opposing side of the frame toward the front end;
a second pair of wheels positioned in tandem, wherein the second pair of wheels are secured to a second rigid member that is pivotally mounted to the frame such that the second pair of wheels are located on a second opposing side of the frame toward the front end;
a third pair of wheels positioned in tandem, wherein the third pair of wheels are secured. to a third rigid member that is pivotally mounted to the frame such that the third pair of wheels are located on a first opposing side of the frame toward the rear end; and
a fourth pair of wheels positioned in tandem, wherein the fourth pair of wheels are secured to a fourth rigid member that is pivotally mounted to the frame such that the fourth pair of wheels are located on a second opposing side of the frame toward the rear end.

In another aspect, the invention is directed to a carriage system for a moving mobile device between a first end and a second end along a main scanning direction that includes:
a track means that extends along a first direction that is parallel to the main scanning direction; and
a carriage assembly that comprises:
(i) a frame having a longitudinal axis, an upper surface, a lower surface, a front end and a rear end;
(ii) a first pair of wheels positioned in tandem that engage the track means, wherein the first pair of wheels are secured to a first rigid member that is pivotally mounted to the frame such that the first pair of wheels are located on a first opposing side of the frame toward the front end;
(iii) a second pair of wheels positioned in tandem that engage the track means, wherein the second pair of wheels are secured to a second rigid member that is pivotally mounted to the frame such that the second pair of wheels are located on a second opposing side of the frame toward the front end;
(iv) a third pair of wheels positioned in tandem that engage the track means, wherein the third pair of wheels are secured to a third rigid member that is pivotally mounted to the frame such that the third pair of wheels are located on a first opposing side of the frame toward the rear end; and
(v) a fourth pair of wheels positioned in tandem that engage the track means, wherein the fourth pair of wheels are secured to a fourth rigid member that is pivotally mounted to the frame such that the fourth pair of wheels are located on a second opposing side of the frame toward the rear end.

In a further aspect, the invention is directed to a method of moving a mobile scanning device back and forth along a main scanning path on a track means that extends along a first direction that is parallel to the main scanning direction so as to reduce vertical misalignment of the scanning device profile, which includes the steps of:
(a) providing a carriage assembly that includes:
(i) a frame having a longitudinal axis, an upper surface, a lower surface, a front end and a rear end;
(ii) a first pair of wheels positioned in tandem that engage the track means, wherein the first pair of wheels are secured to a first rigid member that is pivotally mounted to the frame such that the first pair of wheels are located on a first opposing side of the frame toward the front end;

(iii) a second pair of wheels positioned in tandem that engage the track means, wherein the second pair of wheels are secured to a second rigid member that is pivotally mounted to the frame such that the second pair of wheels are located on a second opposing side of the frame toward the front end;

(iv) a third pair of wheels positioned in tandem that engage the track means, wherein the third pair of wheels are secured to a third rigid member that is pivotally mounted to the frame such that the third pair of wheels are located on a first opposing side of the frame toward the rear end; and (v) a fourth pair of wheels positioned in tandem that engage the track means, wherein the fourth pair of wheels are secured to a fourth rigid member that is pivotally mounted to the frame such that the fourth pair of wheels are located on a second opposing side of the frame toward the rear end, wherein each rigid member has a pivot point at the middle as to allow for upward vertical motion of the first wheel that is secured to the rigid member and for simultaneous reciprocating downward vertical motion of the second wheel that is secured to the rigid member; and (b) driving the carriage assembly back and forth along the main scanning path.

BREIF DESCRIPTION OF THE DRAWINGS

DESCRIPTION OF PREFERRED EMBODIMENTS

Figure 1:
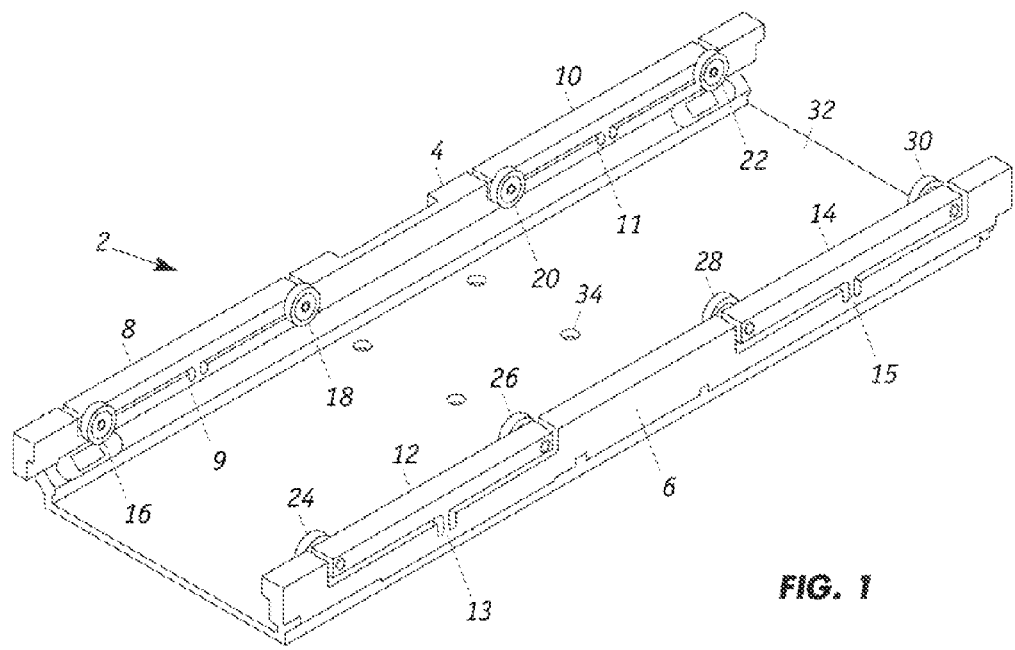
FIG. 1 is a perspective view of a roller carriage.

FIG. 1 shows a roller carriage 2 that has an elongated frame or panel 32 with lateral members 4 and 6 secured to its sides. Lateral member 4 defines two slots or gaps into which pivot bars 8 and 10 are positioned. Bar 8 is secured to the middle of the slot by a flexible spring mechanism 9 while bar 10 is secured by a flexible spring mechanism 11 to the middle of the slot. Similarly, lateral member 6 defines two slots or gaps into which pivot bars 12 and 14 are positioned. Bars 12 and 14 are secured to the middle of slots with flexible spring mechanism 13 and 15, respectively. Each spring mechanism is connected to a pivot bar at its midpoint and serves as a pivot point. Alternatively, a pivot ball assembly can be used. Pinned joint or live hinge devices can be employed as pivot connections.

Each pivot bar supports a pair of wheels that are arranged in tandem and are mounted equal distance from the pivot point. Thus, on one side of roller carriage 2, dual wheels 16, 18 are secured at opposite ends of the pivot bar 8 and dual wheels 20, 22 are secured at opposite ends of the pivot bar 10. Similarly, on the other side of roller carriage 2, dual wheels 24, 26 are secured at opposite ends of pivot bar 12 and dual wheels 28, 30 are secured at opposite ends of pivot bar 14. Preferably, the diameters of the wheels are all the same and the distance between each dual set of wheels is preferably the same for all four sets. The distance between inner wheels 18 and 20 (and between wheels 26 and 28) does not need to be the same as that between the dual wheels, that is, the spacing between the pairs of wheels is arbitrary; however, in a preferred embodiment, the distance is the same as that between the wheels the dual wheels. Panel 32 includes apertures 34 through which bolts are employed to secure a device that is to be transported by the roller carriage.

Figure 2:
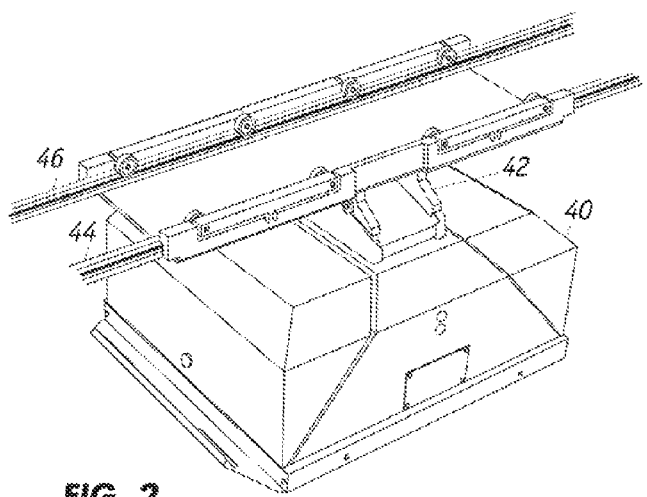
FIG. 2 shows the roller carriage positioned on a set of tracks and from which a sensor head is suspended.

The roller carriage of the present invention is particularly suited for transporting articles along a suspended track system, that is, one that is positioned above the ground. In this fashion, the roller carriage can transport a detection device travel over a sheet or other material being monitored. For example, FIG. 2 depicts a set of suspended tracks 44 and 46 dimensioned to accommodate the wheels of a roller carriage that is transporting a sensor head 40 that is attached to the underside of the carriage via support assembly 42. Tracks 44, 46 define a fixed path in the main scanner direction through which the carriage transports the suspended sensor head 40. A single sensor head 40 can be employed to measure physical properties of a material when the sensor is operating in the reflection mode. For example, if infrared radiation detection is employed, sensor head 40 will house both the source of the infrared radiation as well as the detector that captures radiation reflected from the material of interest.

Figure 3:
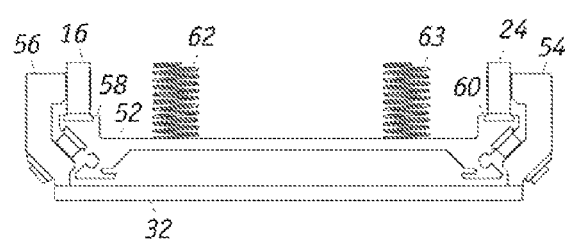
FIG. 3 is a front view of the roller carriage and track.

As shown in FIG. 3, tracks 58, 60 are situated on opposite sides of a transverse, rigid member 52 that is supported by vertical track supports 62, 63 that are secured to an elevated support beam (not shown). Lateral members 56 and 54, which are connected to the outer perimeter of panel 32 of the roller carriage, flank tracks 58 and 60, respectively. As further described herein, the pivot mechanisms of wheels 16 and 24, which are mounted to pivot bars (not shown) on the roller carriage, permit each wheel to independently respond to discontinuities on the otherwise flat, low-friction track surfaces.

Figure 4:
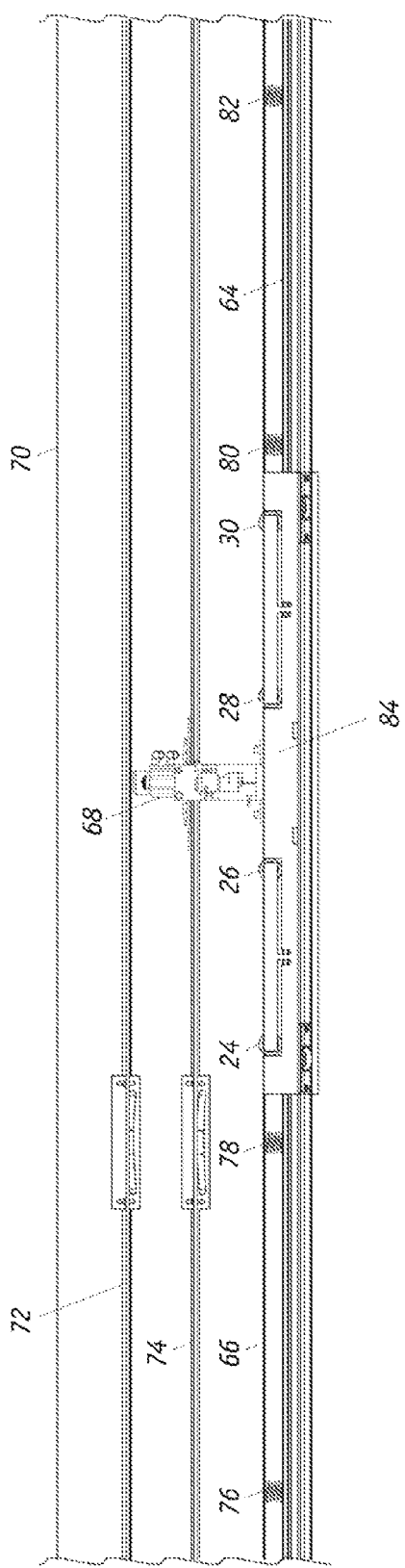
FIG. 4 is a side view of a supporting beam structure with the roller carriage being supported on the track.

The roller carriage can be incorporated into a scanning system that is used, for instance, to monitor physical characteristics of a web of paper in an industrial papermaking machine. As shown in FIG. 4, the scanning system includes an upper support beam 70 that has a lower surface 66 to which a plurality of rigid support structures 76, 78, 80 and 82 are mounted. These elongated, vertical structures are typically spaced laterally apart at a distance "d" as they support track 64. Wheels 24, 26, 28 and 30 of roller carriage 84 engage track 64 as the carriage advances along the cross direction to a moving sheet (not shown). Controlled movement of the carriage is facilitated with a drive mechanism that includes an endless drive belt 72, 74 that is coupled to a linkage assembly 68 that is connected to roller carriage 84.

Because track 64 is supported by a series of individual vertical support structures, the track tends to sag along the intervals between the structures such that the track exhibits a sinusoidal pattern along its length. Specifically, if the distance between the track supports is "d" then the largely sinusoidal deflection period of the track is also equal to "d." In order to compensate for the sinusoidal nature of track 64, the roller carriage is designed so that all the wheels have the same diameter; in addition, for each pair of wheels, the distance between the two wheels is equal to $(n \times d) + d/2$ where n is equal to 0, 1, 2, . . . While n can be any whole number, in practice, n is preferably equal to zero so that the distance between the two wheels is equal to d/2, which is the design used for roller carriage shown in FIG. 4. In addition, the distance between inners wheels 26 and 28 is also equal to d/2. The effect of employing a roller carriage where the wheels are so configured is that the plane of the frame of the roller carriage remains horizontal as the carriages moves despite the sinusoidal nature of the track.

Figure 5A:
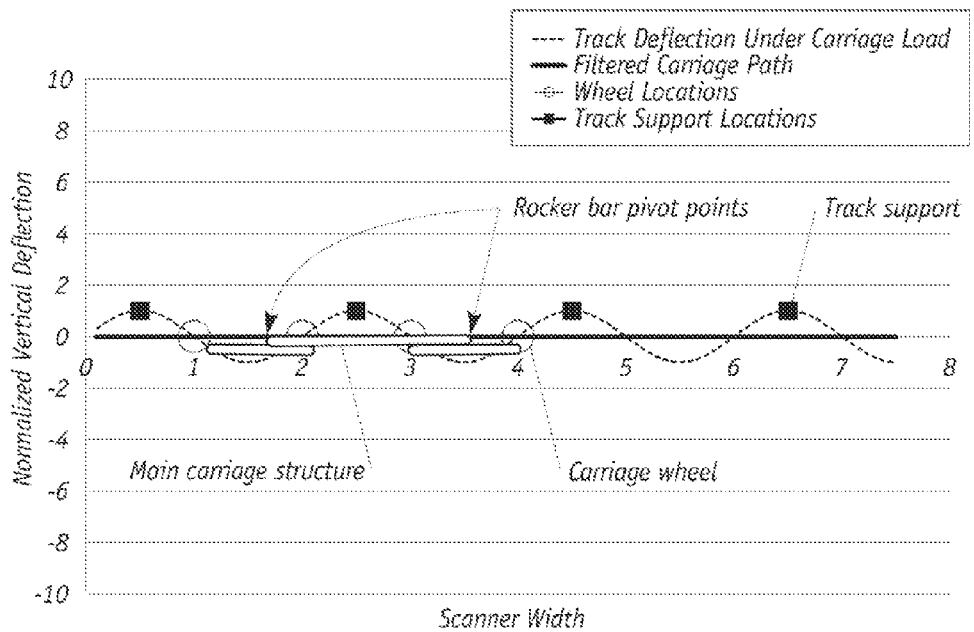
FIGS. 5A and 5B show the independent movements of the wheels on the roller carriage in relationship to mounting points of the track support.
Figure 5B:
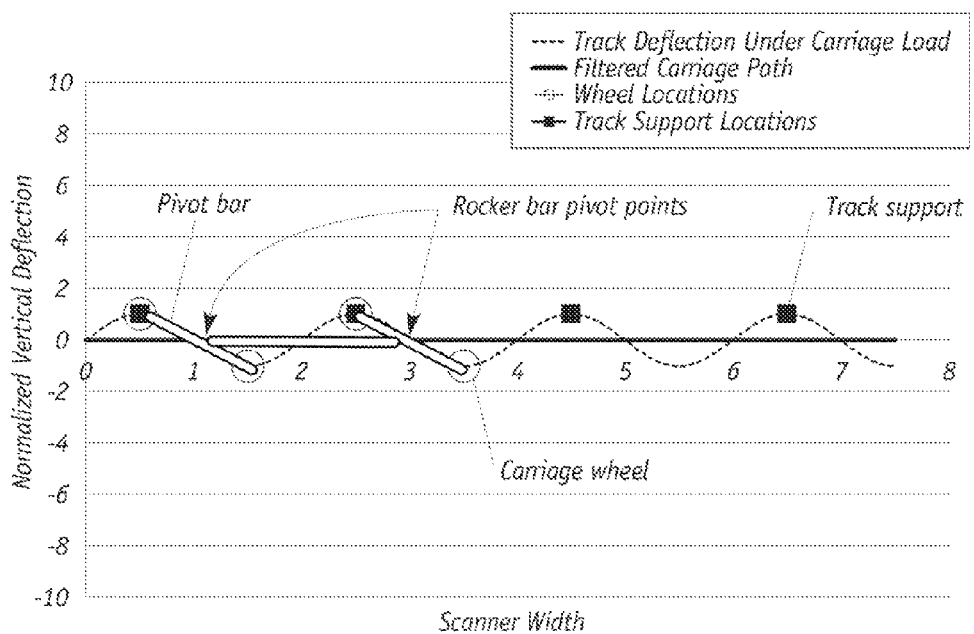

FIGS. 5A and 5B simulate the path of a roller carriage in the case where the track supports are separated by a distance d and the spacing between wheels on the pivoting rocker arms is set to d/2. Although not critical, in this example, the distance between the inner wheels and is also equal to d/2. FIG. 5A shows the position of the wheels when the mid point of the frame (main carriage structure) is at one of the track support locations. As shown, the pivot bars are both parallel to the track at this position. As the roller carriage moves a distance of d/2 on the track as illustrated in FIG. 5B, one wheel of a dual wheel sits at the track height maximum while the other is located at a minima. As is apparent, as the roller carriage moves along the deflection pattern, one wheel of a dual wheel set will be arising as the other fills such that the pivot point largely maintains an average distance between the two wheel heights. In this fashion, the frame of the roller carriage travels along a linear path, i.e., the "filtered" carriage path.

Figure 6:
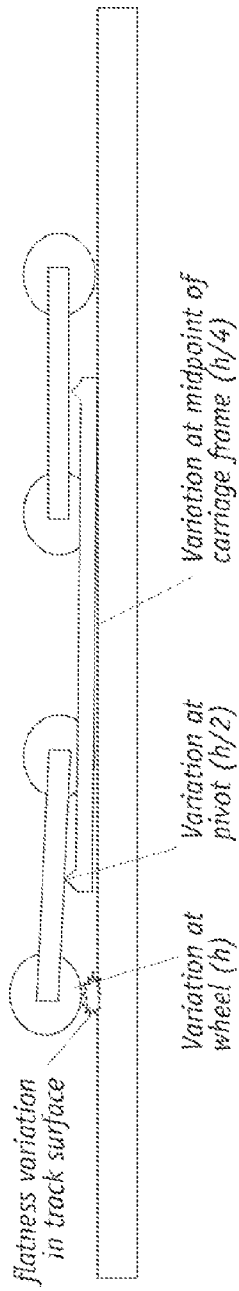
FIG. 6 depicts movement of the roller carriage along the track and operations of the rocker or pivoting mechanism.

Other benefits of using the roller carriage is its ability to reduce the effect of random vertical deflections that are caused by track debris or wheel concentricity vs. standard non-pivoting wheels and the automatic load sharing of the wheels which enable the use of stiff/hard mating materials. As shown in FIG. 6, as a first wheel encounters debris of size "h," it is raised a distance h, while the pivoting mechanism causes the pivot point to elevate a distance of h/2, and the middle of the frame to elevate a distance of only h/4. In contrast, without the pivot mechanism, the middle of the frame of a similar size roller carriage would be elevated a distance of h/2. In this fashion, the pivot mechanism reduces the effect of vertical deflection by fifty percent.

Figure 7:
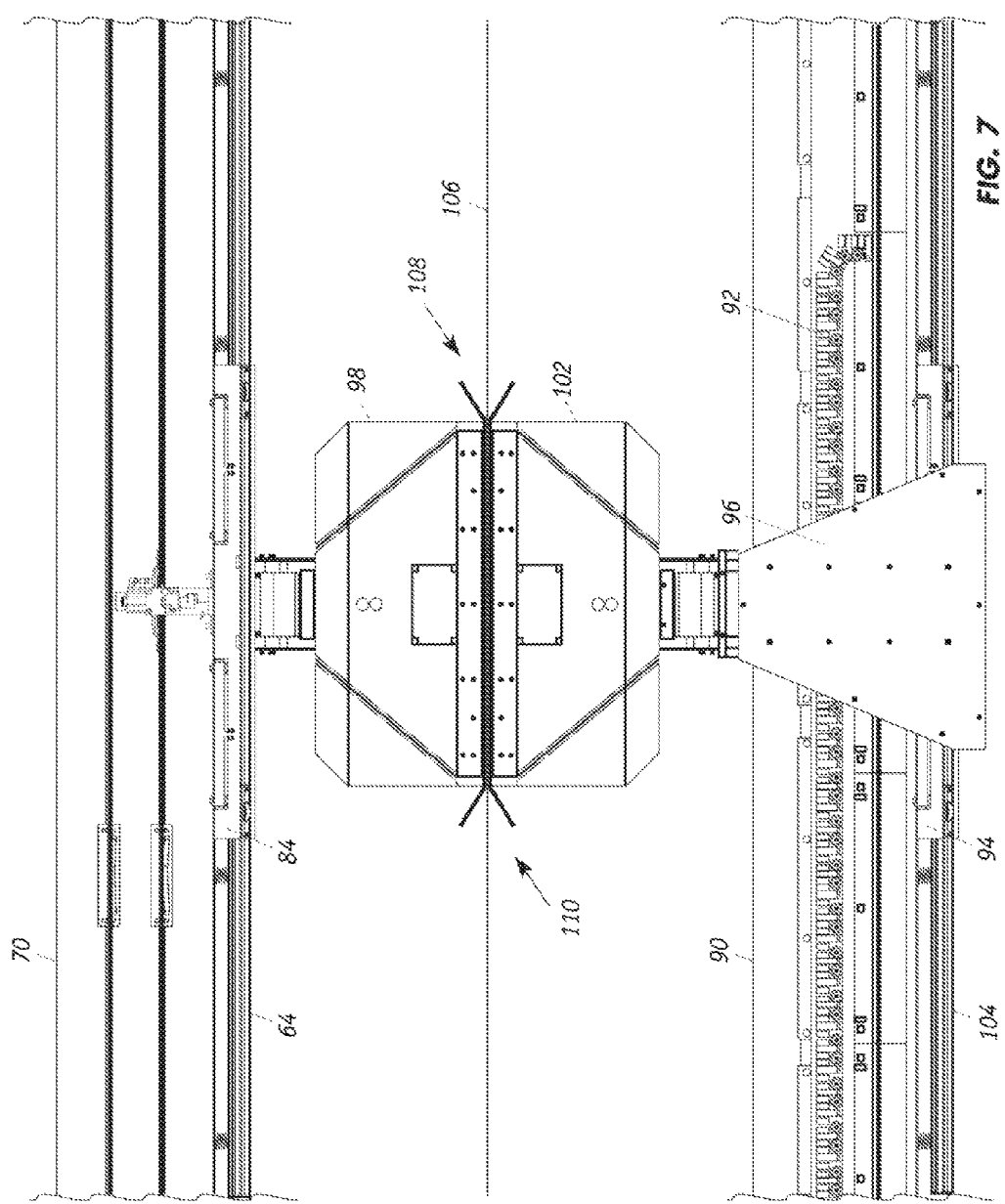
FIG. 7 is a side view of upper and lower structural beams of a scanning system with each beam supporting a roller carriage that supports one of the dual sensor heads.

FIG. 7 shows a scanning system with scanner sensor heads 98 and 102 that employ roller carriages of the present invention. This configuration, which employs dual sensor heads, is typically employed when the sensor is operating in the transmission mode. For example, upper sensor head 98 may house a source of infrared radiation while the lower sensor head 102 houses an infrared detector that measures the radiation that is transmitted through the material being monitored. The upper scanner head 98, as described previously, is supported by an upper support beam 70 that has a lower surface to which a series of laterally spaced apart rigid support structures is mounted. These vertical structures support track 64. The wheels of roller carriage 84 engage track 64 as the carriage advances along the cross direction to a moving sheet 106. The lower scanner head 102 is supported by a lower support beam 90 that has a lower surface on which a plurality of laterally spaced apart rigid support structures is mounted. Movement of the roller carriage is facilitated by a drive mechanism similar to that of the upper scanner head. Vertical structures also support track 104 onto which the wheels of carriage 94 are engage. A power chain supplies 92 electricity and electrical signal to lower scanner head 102. Upper sensor head 102 is mounted on a member 96 that extends from roller carriage 94 so as to position lower sensor head 102 adjacent to upper scanner head 98. The operative faces of the lower and upper scanner heads 102, 98 define a gap with an entry 108 and exit 110 through which a web of material 106, that is moving in the machine direction, passes. The movements of the dual scanner heads 102, 118 are synchronized with respect to speed and direction so that they are aligned with each other. Scanning systems having sensor components on opposite sides of the sheet being analyzed are described, for example, in U.S. Pat. No. 5,773,714 to Shead and U.S. Pat. No. 5,166, 748 to Dahlquist, which are incorporated herein by reference.

Each of the roller carriages in the dual scanner system of FIG. 7 is able to maintain a smoother, linear filtered carriage path because of the pivot mechanism of each carriage.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A transport carriage that comprises:
a frame having a longitudinal axis, an upper surface, a lower surface, a front end and a rear end wherein the frame defines a center portion that rigidly secures a load;
a first pair of wheels which are secured to a first rigid member that is pivotally mounted to the frame such that the first pair of wheels, which comprise a first wheel and a second wheel, are located on a first opposing side of the frame toward the front end wherein the first rigid member has a pivot point in the middle as to allow for upward vertical motion of the first wheel and for simultaneous reciprocating downward vertical motion of the second wheel;
a second pair of wheels which are secured to a second rigid member that is pivotally mounted to the frame such that the second pair of wheels, which comprise a third wheel and a fourth wheel, are located on a second opposing side of the frame toward the front end wherein the second rigid member has a pivot point in the middle as to allow for upward vertical motion of the third wheel and for simultaneous reciprocating downward vertical motion of the fourth wheel;
a third pair of wheels which are secured to a third rigid member that is pivotally mounted to the frame such that the third pair of wheels, which comprise a fifth wheel and a six wheel, are located on the first opposing side of the frame toward the rear end wherein the third rigid member has a pivot point in the middle as to allow for upward vertical motion of the fifth wheel and for simultaneous reciprocating downward vertical motion of the sixth wheel; and
a fourth pair of wheels which are secured to a fourth rigid member that is pivotally mounted to the frame such that the fourth pair of wheels, which comprise a seventh wheel and an eighth wheel, are located on the second opposing side of the frame toward the rear end wherein the fourth rigid member has a pivot point in the middle as to allow for upward vertical motion of the seventh wheel and for simultaneous reciprocating downward vertical motion of the eighth wheel wherein the first pair of wheels is transversely mounted on the frame relative the second pair of wheels and wherein the third pair of wheels is transversely mounted on the frame relative to the fourth pair of wheels so that the first, second, fifth and sixth wheels are positioned in tandem with the separation between adjacent wheels being the same and the third, fourth, seventh and eighth wheels are positioned in tandem with the separation between adjacent wheels being the same and wherein all the wheels have the same diameter such that, as the transport carriages is driven, the vertical travel of all the wheels together averages to zero so that the frame moves along a smooth linear horizontal path.

2. A scanning system for a mobile sensor device that is driven between a first end and a second end along a main scanning direction wherein the mobile sensor device is rigidly secured to a roller carriage assembly that is transported on track means that extends along a first direction that is parallel to the main scanning direction wherein the mobile sensor device is operative to measure properties of a moving sheet product, wherein the track means is suspended and sags along intervals in the first direction and wherein the roller carriage assembly comprises:
(i) a frame having a longitudinal axis, an upper surface, a lower surface, a front end and a rear end wherein the mobile sensor device is rigidly mounted to the frame;
(ii) a first pair of wheels that engage the track means and that are secured to a first rigid member that is pivotally mounted to the frame such that the first pair of wheels, which comprise a first wheel and a second wheel, are located on a first opposing side of the frame toward the front end wherein the first rigid member has a pivot point in the middle as to allow for upward vertical motion of the first wheel and for simultaneous reciprocating downward vertical motion of the second wheel;
(iii) a second pair of wheels that engage the track means and that are secured to a second rigid member that is pivotally mounted to the frame such that the second pair of wheels, which comprise a third wheel and a fourth wheel, are located on a second opposing side of the frame toward the front end wherein the second rigid member has a pivot point in the middle as to allow for upward vertical motion of the third wheel and for simultaneous reciprocating downward vertical motion of the fourth wheel;
(iv) a third pair of wheels that engage the track means and that are secured to a third rigid member that is pivotally mounted to the frame such that the third pair of wheels, which comprise a fifth wheel and a six wheel, are located on the first opposing side of the frame toward the rear end wherein the third rigid member has a pivot point in the middle as to allow for upward vertical motion of the fifth wheel and for simultaneous reciprocating downward vertical motion of the sixth wheel; and
(v) a fourth pair of wheels that engage the track means and that are secured to a fourth rigid member that is pivotally mounted to the frame such that the fourth pair of wheels, which comprise a seventh wheel and an eighth wheel, are located on the second opposing side of the frame toward the rear end wherein the fourth rigid member has a pivot point in the middle as to allow for upward vertical motion of the seventh wheel and for simultaneous reciprocating downward vertical motion of the eighth wheel wherein the first pair of wheels is transversely mounted on the frame relative the second pair of wheels and wherein the third pair of wheels is transversely mounted on the frame relative to the fourth pair of wheels so that the first, second, fifth and sixth wheels are positioned in tandem with the separation between adjacent wheels being the same and the third, fourth, seventh and eighth wheels are positioned in tandem with the separation between adjacent wheels being the same and wherein all the wheels have the same diameter such that, as the mobile sensor device is driven back and forth between the first end and the second end, the vertical travel of all the wheels together averages to zero so that the frame moves along a smooth linear horizontal path.

3. The scanning system of claim 2 wherein the track means comprises (i) a first elongated member that extends along the first direction and the first pair of wheels and the third pair of wheels engage the first elongated member and (ii) a second elongated member extends along the first and that is transversely spaced apart from the first elongated member and the second pair of wheels and the fourth pair of wheels engage the second elongated member.

4. The scanning system of claim 3 wherein the frame defines a center portion that supports the mobile device.

5. The scanning system of claim 2 wherein, for each pair of wheels, each wheel pivots upwardly upon encountering a bump or obstruction along the track means and pivots downwardly upon encountering a depression or drop along the track means.

6. The scanning system of claim 2 wherein the track means is supported by a plurality of vertical beam structures that are spaced laterally apart at equal-distances of d along the length of the first direction and wherein the distance between adjacent wheels is equal to $(n \times d) + d/2$ where n is equal to $0, 1, 2, \ldots$.

7. The scanning system of claim 2 wherein for each pair of wheels the upward vertical motion of one of the wheels has a first fixed range and the downward vertical motion of the other wheel has a second fixed range which is equal to that of the first.

8. A method of moving a mobile scanning sensor device, which is operative to measure properties of a moving sheet product, back and forth along a main scanning path on a track means that extends along a first direction that is parallel to the main scanning direction so as to reduce vertical misalignment of the scanning sensor device profile, which comprises the steps of:
(a) providing a roller carriage assembly that comprises:
(i) a frame having a longitudinal axis, an upper surface, a lower surface, a front end and a rear end wherein the mobile scanning sensor device is rigidly mounted to the frame;
(ii) a first pair of wheels that engage the track means, that is suspended and sags along intervals in the first direction, and that are secured to a first rigid member that is pivotally mounted to the frame such that the first pair of wheels, which comprise a first wheel and a second wheel, are located on a first opposing side of the frame toward the front end wherein the first rigid member has a pivot point in the middle as to allow for upward vertical motion of the first wheel and for simultaneous reciprocating downward vertical motion of the second wheel;
(iii) a second pair of wheels that engage the track means and that are secured to a second rigid member that is pivotally mounted to the frame such that the second pair of wheels, which comprise a third wheel and a fourth wheel, are located on a second opposing side of the frame toward the front end wherein the second rigid member has a pivot point in the middle as to allow for upward vertical motion of the third wheel and for simultaneous reciprocating downward vertical motion of the fourth wheel;
(iv) a third pair of wheels that engage the track means and that are secured to a third rigid member that is pivotally mounted to the frame such that the third pair of wheels, which comprise a fifth wheel and a six wheel, are located on the first opposing side of the frame toward the rear end wherein the third rigid member has a pivot point in the middle as to allow for upward vertical motion of the fifth wheel and for simultaneous reciprocating downward vertical motion of the sixth wheel; and (v) a fourth pair of wheels that engage the track means and that are secured to a fourth rigid member that is pivotally mounted to the frame such that the fourth pair of wheels, which comprise a seventh wheel and an eighth wheel, are located on the second opposing side of the frame toward the rear end wherein the fourth rigid member has a pivot point in the middle as to allow for upward vertical motion of the seventh wheel and for simultaneous reciprocating downward vertical motion of the eighth wheel wherein the first pair of wheels is transversely mounted on the frame relative the second pair of wheels and wherein the third pair of wheels is transversely mounted on the frame relative to the fourth pair of wheels so that the first, second, fifth and sixth wheels are positioned in tandem with the separation between adjacent wheels being the same and the third, fourth, seventh and eighth wheels are positioned in tandem with the separation between adjacent wheels being the same and wherein all the wheels have the same diameter; and (b) driving the roller carriage assembly back and forth along the main scanning path such that the vertical travel of all the wheels together averages to zero so that the frame moves along a smooth linear horizontal path.

9. The method of claim 8 wherein for each pair of wheels the upward vertical motion of one of the wheels has a first fixed range and the downward vertical motion of the other wheel has a second fixed range which is equal to that of the first.

10. The method of claim 8 wherein each wheel pivots upwardly upon encountering a bump or obstruction along the track means and pivots downwardly upon encountering a depression or drop along the track means.

11. The method of claim 8 wherein the track means is supported by a plurality of vertical beam structures that are spaced laterally apart at equal-distances of d along the length of the first direction and wherein the distance between adjacent wheels is equal to $(n \times d)+d/2$ where n is equal to 0, 1, 2, . . . .

12. The method of claim 11 wherein the track means defines an elongated track surface and the vertical beam structures cause the track surface to exhibit a vertical deflection pattern.

13. The method of claim 12 wherein the vertical deflection pattern is characterized as a sinusoidal deflection pattern.

\* \* \* \* \*